US010769660B2

(12) United States Patent
Adoni et al.

(10) Patent No.: US 10,769,660 B2
(45) Date of Patent: Sep. 8, 2020

(54) DETERMINING ADVERTISEMENT CONTENT BASED ON CLUSTER DENSITY WITHIN DYNAMIC VISIBILITY FENCE

(71) Applicant: INTERNATIONAL BUSINESS MACHINES CORPORATION, Armonk, NY (US)

(72) Inventors: Siddique M. Adoni, Bangalore (IN); Gregory J. Boss, Saginaw, MI (US); Norbert Herman, Denver, CO (US); Shubhadip Ray, Secaucus, NJ (US); Dhandapani Shanmugam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 753 days.

(21) Appl. No.: 15/260,482

(22) Filed: Sep. 9, 2016

(65) Prior Publication Data
US 2018/0075481 A1 Mar. 15, 2018

(51) Int. Cl.
G06Q 30/02 (2012.01)
G06F 16/28 (2019.01)

(52) U.S. Cl.
CPC ....... *G06Q 30/0254* (2013.01); *G06F 16/285* (2019.01)

(58) Field of Classification Search
CPC .......................... G06Q 30/0254; G06F 16/285
See application file for complete search history.

(56) References Cited

U.S. PATENT DOCUMENTS

| 7,466,241 B2 | 12/2008 | Lyle et al. |
| 8,254,338 B2 | 8/2012 | Anschutz et al. |
| 8,447,421 B2* | 5/2013 | Capio .................. G06F 16/435 700/94 |
| 2003/0046158 A1 | 3/2003 | Kratky |
| 2006/0229939 A1 | 10/2006 | Bhakta et al. |

(Continued)

FOREIGN PATENT DOCUMENTS

| CN | 204117561 | 1/2015 |
| WO | 2013025803 | 2/2013 |

OTHER PUBLICATIONS

Chen et al. Face-based multiple instance analysis for smart electronics billboard. Multimed. Tools Appl. (2012) 59:221-240. (Year: 2012).*

(Continued)

*Primary Examiner* — William A Brandenburg
*Assistant Examiner* — Christopher C Busch
(74) *Attorney, Agent, or Firm* — Brian Restauro; Andrew D. Wright; Roberts, Calderon, Safran & Cole, P.C.

(57) ABSTRACT

Systems and methods for determining advertisement content based on cluster density analysis of advertisement targets within a dynamic visibility fence are disclosed. A computer-implemented method includes determining, by an advertisement determination device, a dynamic visibility fence for a time, the dynamic visibility fence defining a first set of advertisement targets, determining, by the advertisement determination device, an advertisement to display based on cluster analysis of the first set of advertisement targets, and displaying, by the advertisement determination device, the determined advertisement.

20 Claims, 12 Drawing Sheets

(56) References Cited

U.S. PATENT DOCUMENTS

| | | |
|---|---|---|
| 2009/0125343 A1 | 5/2009 | Cradick et al. |
| 2010/0223112 A1 | 9/2010 | Griffin et al. |
| 2013/0041753 A1 | 2/2013 | Sathyanath et al. |
| 2013/0060642 A1* | 3/2013 | Shlomot ............ G06Q 30/0241 705/14.66 |
| 2013/0129149 A1 | 5/2013 | Nandakumar et al. |
| 2015/0081421 A1 | 3/2015 | Moseman et al. |
| 2015/0363828 A1* | 12/2015 | Mantalovos ......... G08G 1/0116 705/14.58 |
| 2016/0125519 A1* | 5/2016 | Sundaresan ............ G06Q 30/08 705/26.3 |
| 2016/0292744 A1* | 10/2016 | Strimaitis .......... G06Q 30/0269 |
| 2017/0026786 A1* | 1/2017 | Barron .................. H04W 4/021 |

OTHER PUBLICATIONS

Mell et al., "The NIST Definition of Cloud Computing", NIST, Special Publication 800-145, Sep. 2011, 7 pages.

* cited by examiner

DETERMINING ADVERTISEMENT CONTENT BASED ON CLUSTER DENSITY WITHIN DYNAMIC VISIBILITY FENCE

BACKGROUND

The present invention generally relates to an advertisement determination device, system, and method and, more particularly, to a device, system, and method for determining advertisement content based on predicted cluster density analysis of advertisement targets within a dynamic visibility fence.

The nature of advertising is changing from mere display and distribution of advertising materials to providing targeted and customized content in order to more effectively persuade the subjects of the advertisement. Targeted mailings based on household demographic information have long been used but such advertising is subject to errors because of the slow and rare receiving of demographic information. However, modern devices provide real-time data, which may be analyzed to determine characteristics of a user. The Internet of Things (IoT) is a network of physical objects, devices, vehicles, buildings, and other items, embedded with electronics, software, sensors, and network connectivity to collect and exchange data. The IoT allows objects to be sensed and controlled remotely across existing network infrastructure, creating opportunities for more-direct integration between the physical world and computer-based systems, resulting in improved efficiency and accuracy of, for example, determining demographic information.

SUMMARY

In an aspect of the invention, a computer-implemented method includes: determining, by an advertisement determination device, a dynamic visibility fence for a time, the dynamic visibility fence including a first set of advertisement targets; determining, by the advertisement determination device, an advertisement to display based on cluster analysis of the first set of advertisement targets; and displaying, by the advertisement determination device, the determined advertisement.

In an aspect of the invention, there is a computer program product for an advertisement system for users. The computer program product includes a computer readable storage medium having program instructions embodied therewith. The program instructions are executable by an advertisement determination device to cause the advertisement determination device to: receive data from at least one sensor of the advertisement determination device; predict a dynamic visibility fence for a time based on the received data, the dynamic visibility fence defining a first set of advertisement targets; determine an advertisement to display based on the received data of the first set of advertisement targets; and display the determined advertisement.

In an aspect of the invention, there is a system, which includes a CPU, a computer readable memory and a computer readable storage medium associated with an advertisement determination device, program instructions to determine a first dynamic visibility fence defining a first area at least partially about an advertising surface, program instructions to determine that a first advertisement target is located within the determined first dynamic visibility fence, program instructions to determine a line of sight of the first advertisement target to the advertising surface, and program instructions to display a first advertisement on the advertising surface based at least in part on the determined line of sight of the first advertisement target, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
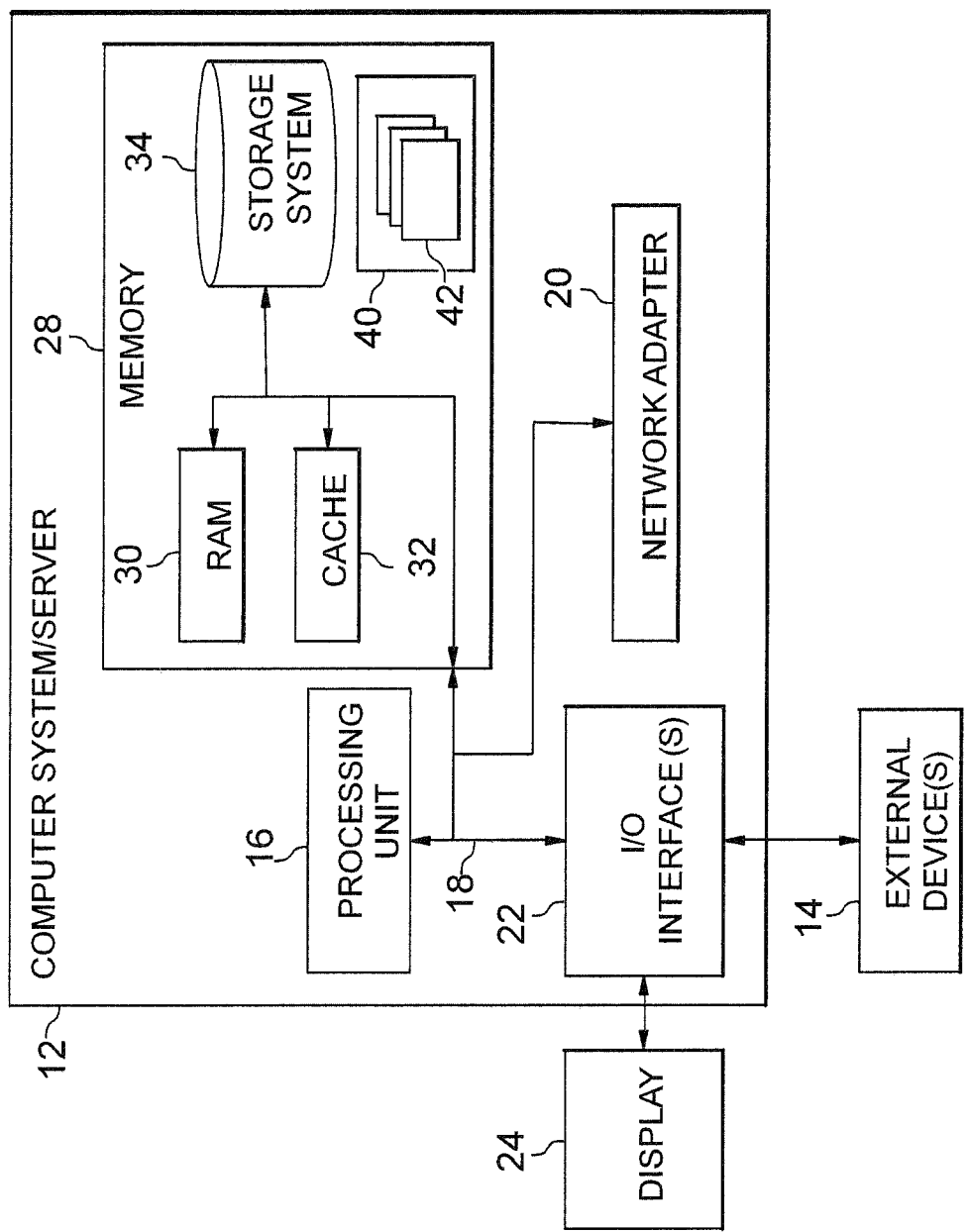
FIG. 1 depicts a cloud computing node according to an embodiment of the present invention.

The present invention relates to an advertisement determination device, system, and method and, more particularly, to a device, system, and method for determining advertisement content based on cluster density analysis of advertisement targets within a dynamic visibility fence. Aspects of the invention leverage the Internet of Things (IoT) to determine advertisements and content on any given billboard for a group of vehicles in traffic based on the billboard's visibility to drivers in the area. The system and method dynamically predict and/or determine a specific target audience and density for a dynamically determined visibility fence of any given public display system by leveraging Cognitive IoT. Methods are described that leverage traffic flow, velocity, obstructions, line of site and driver preferences to optimize the content and placement of advertisements on billboards.

Aspects of the present invention provide a technical solution to the technical problem of identifying persons near a location and the interests of those persons. For example, a system and method for optimizing advertisement visibility on a billboard includes determining a dynamic visibility fence of a billboard and contents of advertisements, e.g., size and color, displayed on the billboard, analyzing traffic patterns to predict when traffic will be within the dynamic visibility fence, and selecting and displaying personalized or custom advertisements on the billboard based on line of sight from the advertisement targets to the billboard, traffic rules, and context derived from the Internet of Things (IoT).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
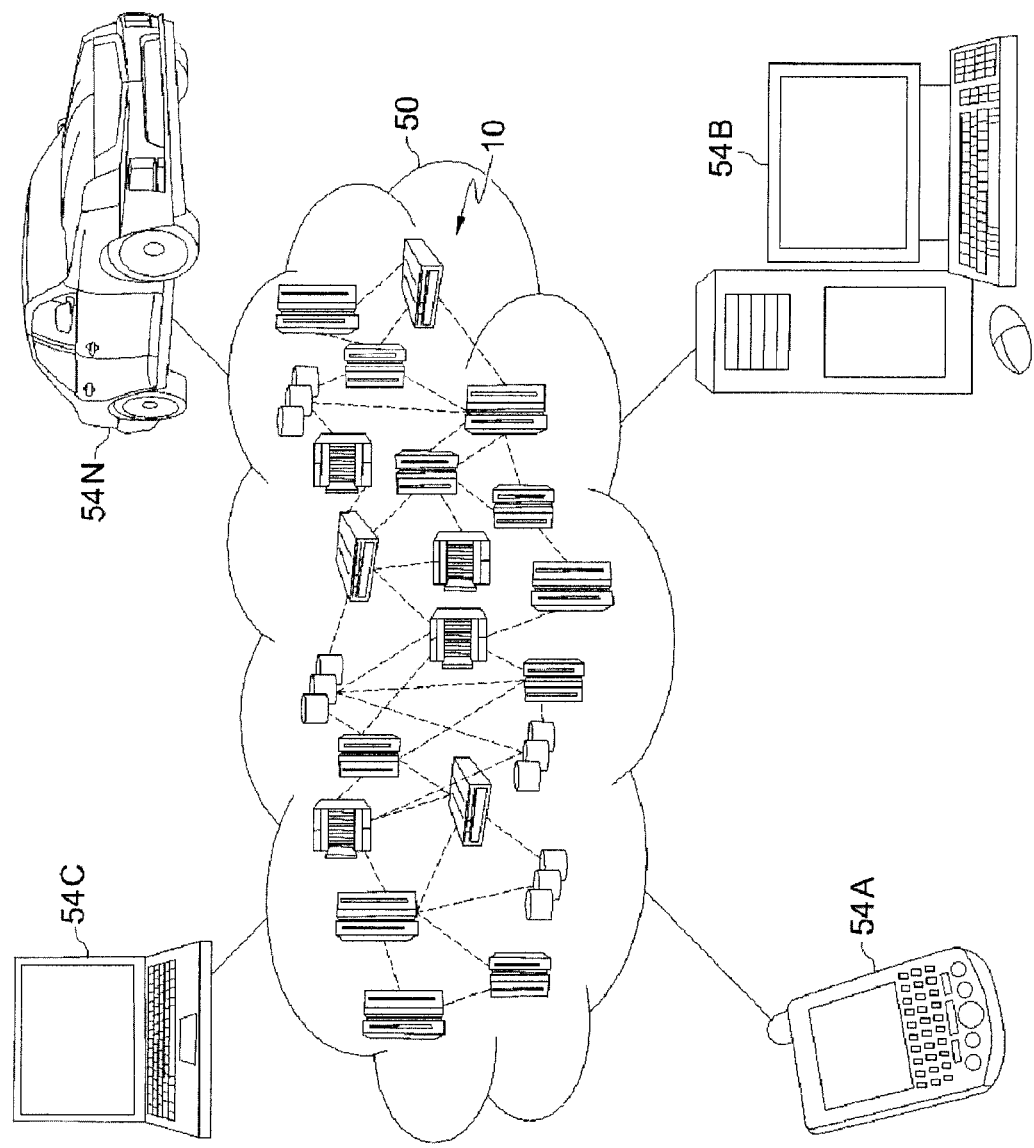
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
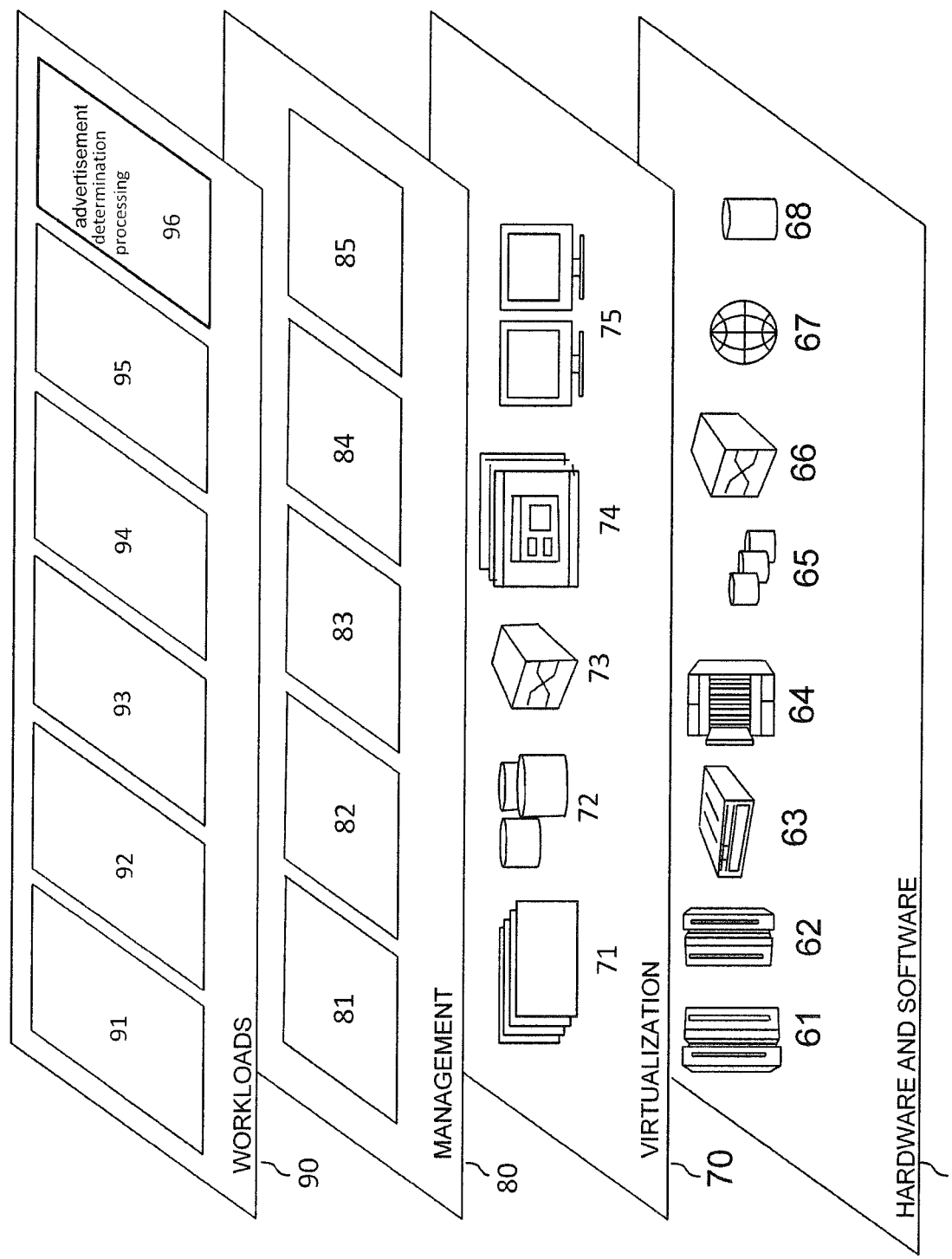
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and advertisement determination processing 96.

Referring back to FIG. 1, the program/utility 40 may include one or more program modules 42 that generally carry out the functions and/or methodologies of embodiments of the invention as described herein (e.g., such as the functionality provided by the advertisement determination processing 96). Specifically, the program modules 42 may receive data provided from sensors of an advertisement determination device, determine to what extent a user is interacting with the advertisement determination device, determine various attributes and conditions of one or more users, determine events near and potential dangers to the user based on the analysis, and provide notifications of warnings, alerts, or information. Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
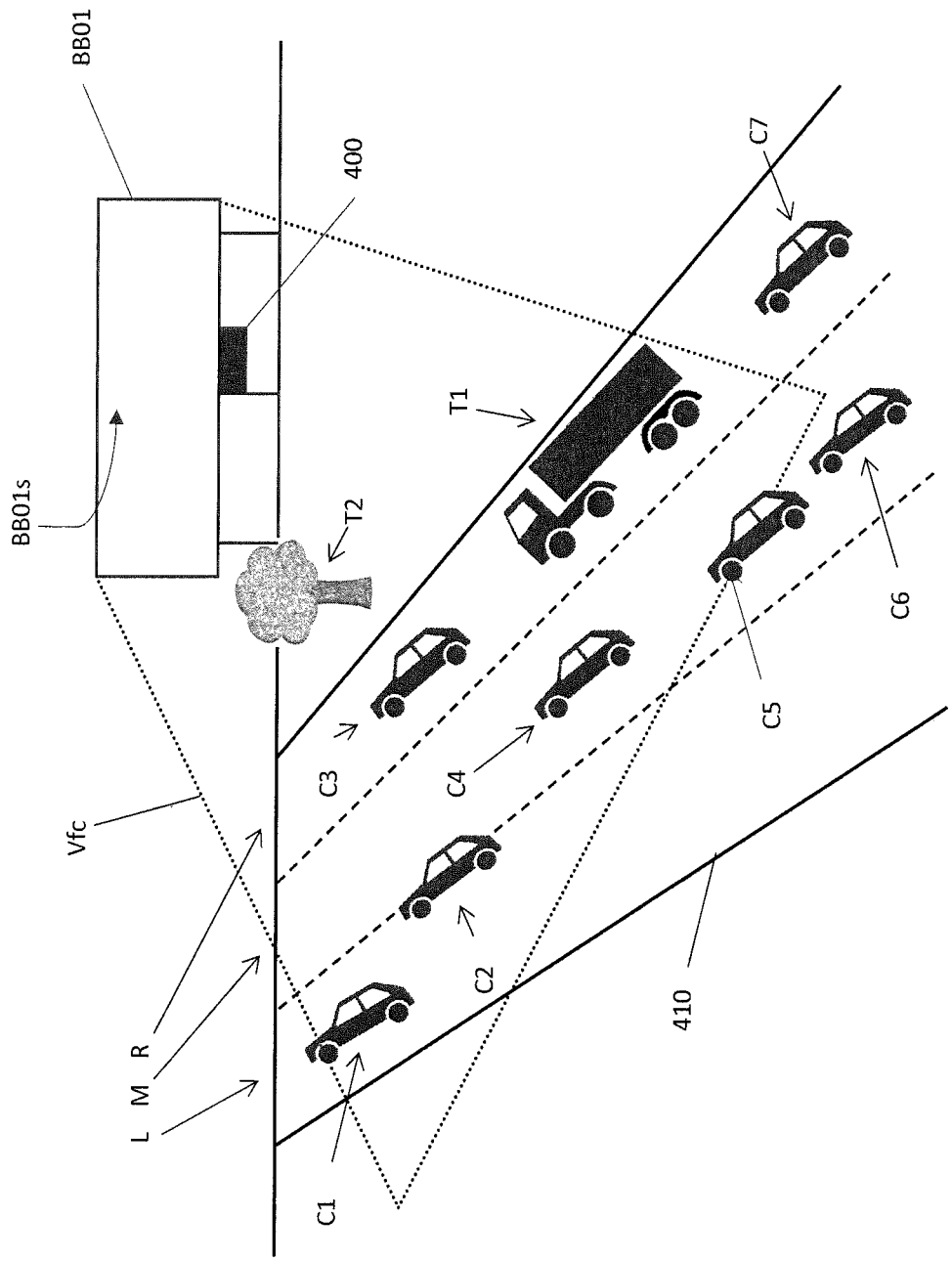
FIG. 4 shows an advertisement system according to aspects of the present invention.

FIG. 4 shows an advertisement system according to aspects of the present invention. The advertisement system includes a billboard BB01, having an advertising surface BB01s on which an advertisement is displayed, and an advertisement determination device 400. Although only the billboard BB01 is illustrated, the advertisement system may include billboards BB01, BB02, ... BBnn disposed along a roadway. The billboard BB01 and the advertisement determination device 400 are shown in FIG. 4 as being disposed adjacent to highway 410; however, aspects need not be limited thereto such that the billboard BB01 and the advertisement determination device 400 may be disposed adjacent to other roadways or not near roadways, e.g., on a building, stadium, and the like, in any location capable of accommodating the advertising surface BB01s. According to aspects, the billboard BB01 is merely exemplary such that the advertisement determination device 400 may be applied to other advertising surfaces to present advertisements based on the analysis of the advertisement targets or audience. For example, the advertisement determination device 400 may be applied to determine advertisements displayed on advertising surfaces, such as, movie screens in a movie theater; sides of cars, trucks, tractor trailers, trailers, busses, airplanes, blimps, buildings, stadiums, etc; any display on which advertisements are shown; etc.

FIG. 4 shows the advertisement determination device 400 disposed on the billboard BB01 below the advertising surface BB01s; however, aspects need not be limited thereto such that the advertisement determination device 400 may be disposed above or to the side of the advertising surface BB01s or may be disposed separate from the billboard BB01. For example, the advertisement determination device 400 may be disposed by itself in or adjacent to an area having an advertisement target or audience, e.g., in tree T2 or on a guardrail or sign. The advertisement determination device 400 may include one or more devices connected to each other wirelessly or through wires, and may be distributed in or throughout the area having an advertisement target or audience. The advertisement determination device 400 may be distributed over miles along a road or may communicate with other advertisement determination devices to predict traffic at one or more locations along the road.

The advertising surface BB01s of the billboard BB01 may be a display device controllable to display various determined advertisements in accordance with aspects of the invention. For example, the advertising surface BB01s may be a self-emissive or backlit display device, a cathode ray tube (CRT) display, a light emitting diode (LED) display, a liquid crystal display (LCD), a plasma display, etc.

In FIG. 4, cars C1-C7 and truck T1 are shown travelling along a highway 410, which includes a left lane L, a middle lane M, and a right lane R. The middle lane M is between the left lane L and the right lane R, and the right lane R is between the middle lane M and the billboard BB01. Car C1 is in the left lane L, cars C4, C5, and C6 are in the middle lane M, and cars C3 and C7 and truck T1 are in the right lane R. Car C2 is changing lanes from the left lane L to the middle lane M. The truck T1 and tree T2 may obstruct a view of the billboard BB01 from the highway 410. For example, the tree T2 obstructs the view of the passengers, e.g., target subjects, of car C3 and the truck T1 obstructs the view of the passengers of car C5.

The advertisement determination device 400 determines a dynamic visibility fence Vfc according to aspects of the invention. The dynamic visibility fence Vfc is a calculated and/or determined area from where advertisement targets are predicted to be and/or determined to be capable of seeing the advertising surface BB01s of the billboard BB01. The dynamic visibility fence Vfc may be understood or described as a dynamic geofence based on visibility of the advertising surface, e.g., the advertising surface BB01s of the billboard BB01. The advertisement targets may be passengers of vehicles, e.g., cars C1-C7 and truck T1, travelling along a road but are not limited thereto.

Figure 5:
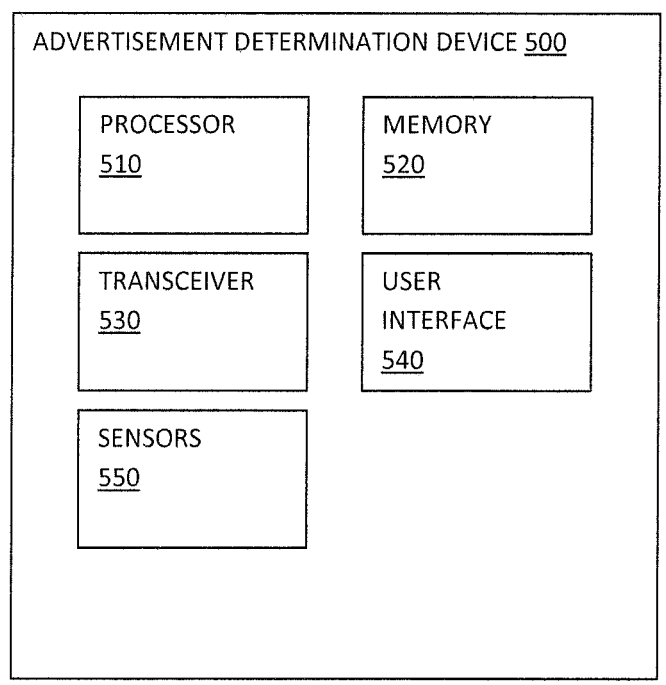
FIG. 5. shows an advertisement determination device in accordance with aspects of the present invention

FIG. 5. shows an advertisement determination device in accordance with aspects of the present invention. In embodiments, the advertisement determination device 500 shown in FIG. 5 may be the advertisement determination device 400 described with respect to FIG. 4. The advertisement determination device 500 includes a processor 510, a memory 520, a transceiver 530, a user interface 540, and at least one sensor 550. The advertisement determination device 500 may comprise each of the processor 510, the memory 520, the transceiver 530, the user interface 540, and the at least one sensor 550 or may include fewer than all of the features illustrated in FIG. 5. For example, the advertisement determination device 500 may include only the processor 510, the memory 520, the transceiver 530, and the at least one sensor 550. According to aspects, the advertisement determination device 500 may comprise the computer system/server 12 of FIG. 1, and may be embodied as a smartphone, tablet computer, laptop computer, dedicated computing device, terminal computer, etc.

In embodiments, the processor 510 analyzes data stored in the memory 520, received via the transceiver 530 and/or the user interface 540, and detected or received via the at least one sensor 550. The processor 510 may control each of the memory 520, the transceiver 530, the user interface 540, and the at least one sensor 550 to perform operations. For example, the processor 510 may correspond to the processing unit 16 of the computer system/server 12 as shown in FIG. 1 and may implement operations of the advertisement determination processing 96 of FIG. 3.

In accordance with aspects of the invention, the processor 510 may determine an advertisement to be displayed on the advertising surface BB01s of the billboard BB01. For example, the processor 510 may determine a dynamic visibility fence, determine a target audience density for the determined visibility fence, determine an advertisement to be displayed according to the determined cluster, and cause the determined advertisement to be displayed on the advertising surface BB01s of the billboard BB01 of FIG. 4. The processor 510 may determine various features by data analysis, machine learning, image analysis, etc. For example, the processor 510 may determine features of an advertising surface BB01s, content size and color of an advertisement, features of advertisement targets, determine which advertisement to display, etc.

In embodiments, the memory 520 stores data collected by the at least one sensor 550. The memory 520 of the advertisement determination device 500 may be similar to the system memory 28 described herein with respect to FIG. 1 and can include computer system readable media in the form of volatile memory, such as random access memory (RAM) and/or cache memory. The memory 520 may store real-time and/or historical data and may allow the processor 510 to access such stored data.

In embodiments, the transceiver 530 may be configured to communicate with other devices directly, for example, via Bluetooth or other direct connection, or via an intermediate network which may include one or more wired and/or wireless networks. For example, the intermediate network may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the intermediate network may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. The transceiver 530 may correspond to at least a portion of or at least one of the Input/Output (I/O) interfaces 22 of the computer system/server 12 as shown in FIG. 1.

The user interface 540 may accept information from and/or provide information to a user of the advertisement determination device 500. The user interface 540 may include one or more display, touch screen, keyboard, microphone, speaker, light emitting diode, vibration generator, stylus, and the like. For example, the user interface 540 may correspond to the display 24 of the computer system/server 12 as shown in FIG. 1. The user interface 540 may, additionally or alternatively, correspond to the advertising surface BB01s of the billboard BB01 as shown in FIG. 4.

The at least one sensor 550 may include one or more sensors that communicate and provide data to the memory 520 to be stored therein according to instructions from the processor 510. The at least one sensor 550 may include at least one of: temperature sensors, audio sensors (e.g., a microphone), light sensors, image sensors, heat sensors, active or passive radio frequency identification (RFID), and the like. For example, the advertisement determination device 500 may incorporate one or more cameras configured to determine a distance to an object, such as a vehicle on a nearby road (e.g., highway 410 in FIG. 4). However, in embodiments, distance may be estimated based on a size of an object, for example, independently or with reference to a standard or known size of the object or another object.

In embodiments, the at least one sensor 550 may be disposed separate from the other features of the advertisement determination device 500 and may communicate with the advertisement determination device 500 via the transceiver 530. For example, the at least one sensor 550 may transmit image and/or sound data to the advertisement determination device 500 and receive commands to change an orientation of the at least one sensor 550. In embodiments, the at least one sensor 550 may be distributed and be devices separate from the advertisement determination device 500, for example, data detected by devices comprising the Internet of Things (IoT) may be received by the advertisement determination device 500.

Figure 6:
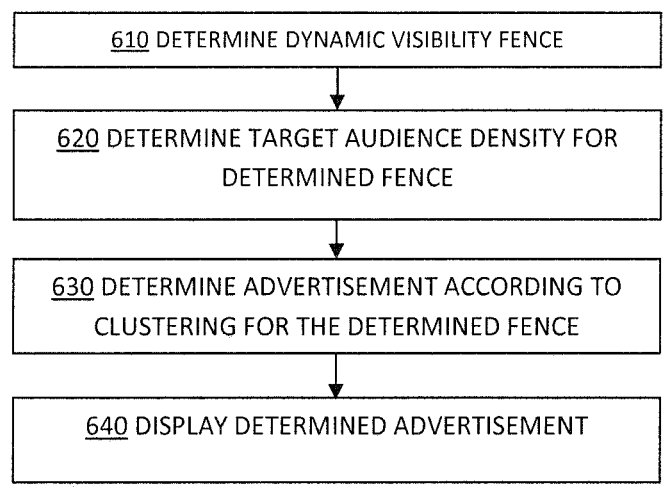
FIG. 6 shows an example flowchart for displaying a determined advertisement according to aspects of the present invention.

FIG. 6 shows an example flowchart for displaying a determined advertisement according to aspects of the present invention. The steps of FIG. 6 may be implemented in the advertisement determination device of FIG. 5, for example, and are described using reference numbers of elements depicted in FIG. 5. The steps of FIG. 6 may also be implemented in any of the computing nodes 10, for example, as described above with reference to FIGS. 1 and 2. As noted above, the flowchart illustrates the architecture, functionality, and operation of possible implementations of systems, methods, and computer program products according to various embodiments of the present invention.

In embodiments, at step 610, the advertisement determination device 500 determines a dynamic visibility fence. For example, the advertisement determination device 500 may determine a dynamic visibility fence in which advertisement targets are determined or are predicted to be based on various data from at least the at least one sensor 550 including, for example, features of the advertising surface BB01s, visibility of the billboard BB01, advertisement content size and color, etc. In this manner, the determining at step 610 may include determining or predicting the dynamic visibility fence. Aspects of step 610 are further described with respect to at least FIG. 7.

At step 620, the advertisement determination device 500 determines a target audience density for the determined visibility fence. For example, the advertisement determination device 500 may determine various features of the advertisement targets to determine the target audience density, such as, location of the advertisement targets, whether the advertisement targets' views are obstructed, and whether the advertisement targets are available to pay attention to an advertisement display on the advertising surface BB01s of the billboard BB01. Aspects of step 620 are further described with respect to at least FIG. 9.

At step 630, the advertisement determination device 500 determines an advertisement according to the clustering for the determined visibility fence. For example, the advertisement determination device 500 may determine and analyze identities of advertisement targets using various methods, such as k-means clustering, and determine an advertisement to display based on such analysis. Aspects of step 630 are further described with respect to at least FIG. 11.

At step 640, the advertisement determination device 500 causes the determined advertisement to be displayed. For example, the processor 510 of the advertisement determination device 500 may cause the determined advertisement to be retrieved via the transceiver 530 and/or stored in the memory 520 to be displayed on the advertising surface BB01s of the billboard BB01. Additionally or alternatively, the advertisement determination device 500 may cause the determined advertisement to be display on one or more of billboards BB01, BB02, . . . BBnn disposed along a roadway. The display of the determined advertisement may cause transistors and/or pixels to change in a display device of the advertising surface BB01s of the one or more billboards BB01, BB02, . . . BBnn disposed along a roadway to emit light in various combinations. Metrics for the displayed advertisements, such as key performance indicators (KPIs)

and conversion, may be determined to analyze effectiveness of the determining by the advertisement determination device 500.

Figure 7:
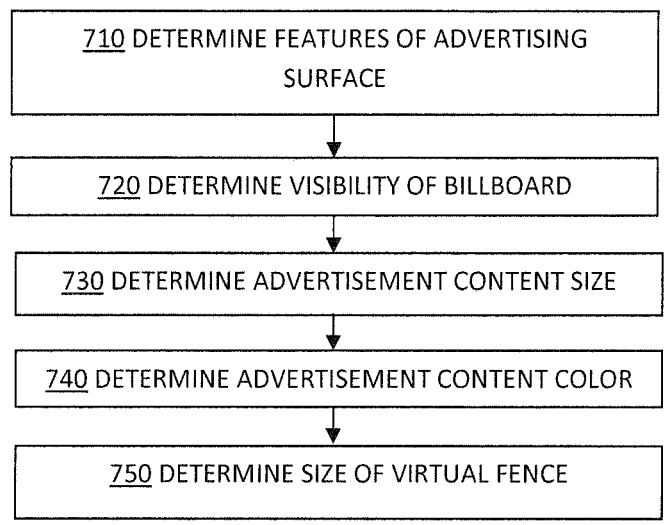
FIG. 7 shows an example flowchart for determining a dynamic visibility fence according to aspects of the present invention.

FIG. 7 shows an example flowchart for determining a dynamic visibility fence according to aspects of the present invention. The operations described in FIG. 7 may be implemented to determine a dynamic visibility fence in accordance with step 610 of FIG. 6. In embodiments, the operations of FIG. 7 may be supplemented or one or more operations may be replaced to arrive at a dynamic visibility fence in accordance with aspects of the invention.

At step 710, the advertisement determination device 500 determines features of the advertising surface on which an advertisement is displayed. The advertising surface may be the advertising surface BB01s of the billboard BB01 as shown in FIG. 4. For example, the features of the advertising surface may include a width w1 of the advertising surface, a height h1 of the advertising surface, and a height h2 above the ground of the advertising surface. The processor 510 may cause the advertisement determination device 500 to, for example, read the features of the advertising surface from the memory 520 or may request retrieval of the features from a network via the transceiver 530. A factor based on at least one of the width w1, height h1, and height h2 may be determined and/or assigned to the advertising surface such that the size of the dynamic visibility fence Vfc may be directly proportional to the features of the advertising surface. For example, the dynamic visibility fence Vfc will be determined to be larger when the height h2 is assigned a factor of 5 indicating that the advertising surface is higher above the ground than when the height h2 is assigned a factor of 1 indicating that the advertising surface is closer to the ground, all other factors being equal.

As used herein and throughout, a factor may indicate or affect a size of the dynamic visibility fence with reference to a default size for a given advertising surface, and such factors may be implemented variously. For example, a first generic factor indicating a first generic property may serve to only increase or only decrease a size of the dynamic visibility fence with respect to a default size, e.g., 0, such that a factor of 1 would only increase or decrease the size of the dynamic visibility fence with reference to the default size 0. In embodiments, a first generic factor indicating a first generic property may increase or decrease a size of the dynamic visibility fence with respect to a default size, e.g., 3 on a scale of 1 to 5, such that factor of 1 would decrease the size of the dynamic visibility fence with respect to the default size 3 while a factor of 5 would increase the size of the dynamic visibility fence with respect to the default size 3.

At step 720, the advertisement determination device 500 determines the visibility of the advertising surface. For example, the advertisement determination device 500 may determine the nature or state of the weather at or about the advertising surface BB01s of the billboard BB01. The advertisement determination device 500 may observe and determine current weather conditions via the at least one sensor 550 or may receive weather information from IoT sensors and/or the Internet. The determined weather may be assigned or indicated by a factor, e.g., on a scale of 1 to 5, based on the extent or quality of the visibility of the advertising surface BB01s of the billboard BB01. For example, a factor of 1 may indicate weather conditions having a low visibility, such as storms, and a factor of 5 may indicate clear having a high visibility, such as a sunny weather. The size of the dynamic visibility fence Vfc may be directly proportional to the determined weather such that the dynamic visibility fence Vfc will be determined to be larger when the weather is assigned a factor of 5 indicating sunny weather than when the weather is assigned a factor of 1 indicating stormy weather, all other factors being equal.

Additionally or alternatively, the advertisement determination device 500 may base the factor assigned to the visibility conditions at least in part according to the time of day for display of the determined advertisement, i.e., during dawn, daylight, dusk, or nighttime. A given advertising surface may be visible at a greater distance in daylight or at night depending upon conditions of the advertising surface as determined at step 710. For example, a large billboard on a side of a highway may be more visible when lit at night than in sunny conditions. Such relationships may be stored in the memory 520 or determined by the advertisement determination device 500. For example, the advertisement determination device 500 may determine or sense via the at least one sensor 550 conditions, including geography and roadways, about the advertising surface. In embodiments, the at least one sensor 550 of the advertisement determination device 500 may include image sensors to detect surroundings of the advertising surface. For example, the advertisement determination device 500 may detect and/or determine visibility from the advertising surface to a distant roadway or geography behind the advertising surface with respect to a direction of travel along the roadway to determine visibility of the advertising surface. Alternatively or additionally, advertisement content size determined according to step 730 and/or advertisement content color determined according to step 740 may be accounted for in the determination of the visibility at step 720.

At step 730, the advertisement determination device 500 determines the advertisement content size. Advertisements having images or text or combinations of image and texts may be easier or harder to read and/or understand at various distances. The advertisement determination device 500 may determine or assign a factor to the various advertisements stored in the memory 520 or received via the transceiver based on the readability of the advertisement content. For example, a product logo may be more easily read and/or understood than an advertisement including ten or fifteen or twenty or more words such that the advertisement including only the product logo is assigned a higher factor than the advertisement including ten or more words. The size of the dynamic visibility fence Vfc may be directly proportional to the determined size of the advertising content such that the dynamic visibility fence Vfc will be determined to be larger when the content is assigned a factor of 5 indicating more easily read content than when the content is assigned a factor of 1 indicating less easily read content, all other factors being equal. Additionally or alternatively, the size of the advertising content may be based on the size of any text or image or the font of the text. Alternatively or additionally, visibility determined according to step 720 and/or advertisement content color determined according to step 740 may be accounted for in the determination of the advertisement content size at step 730.

At step 740, the advertisement determination device 500 determines the advertisement content color. Advertisements may be more or less easily read and/or understood based on the color of emitted light that forms the content of the advertisements, and the ease or difficulty of reading and/or understanding may be based on the surroundings of the advertising surface. Graphical or image analysis may be used, implemented by at least the processor 510, to determine a contrast, internally within the advertisement content and/or externally of the advertisement content compared to the surroundings of the advertising surface, and/or a color of the advertisement content. The determined contrast and/or color may indicate a readability of the advertisement content, and a factor may be determined or assigned to indicate the readability based on the contrast and/or color of the advertisement content. The size of the dynamic visibility fence Vfc may be directly proportional to the factor assigned to the determined contrast and/or color such that the dynamic visibility fence Vfc will be determined to be larger when the readability based on contrast and/or color is assigned a factor of 5 indicating higher readability than when the determined contrast and/or color is assigned a factor of 1 indicating lower readability, all other factors being equal. Alternatively or additionally, individual colors may be assigned a factor, for example, yellow may be assigned a factor of 1, blue may be assigned a factor of 2, green may be assigned a factor of 3, red may be assigned a factor of 4, and black may be assigned a factor of 5. Alternatively or additionally, color combinations may be assigned a factor, for example, yellow text on a white plane may be given a factor of 1 while black text on a white plane may be given a factor of 5. Alternatively or additionally, visibility determined according to step 720 and/or advertisement content size determined according to step 730 may be accounted for in the determination of the advertisement content color at step 740.

At step 750, the advertisement determination device 500 determines a size of the visibility fence. In embodiments, the advertisement determination device 500 analyzes, via at least the processor 510, each of the features of the advertising surface determined at step 710, the visibility of the advertising surface determined at step 720, the content size determined at step 730, and the advertisement content color determined at step 740 to determine a size of the dynamic visibility fence at a particular time. The determined size of the dynamic visibility fence may be directly proportional to at least one of the determined features of the advertising surface, the determined visibility of the advertising surface, the determined content size, and the determined advertisement content color.

The shape of the dynamic visibility fence may be determined as a polygon and may comprise smaller determined polygons. In embodiments, the dynamic visibility fence at a specific time, for example t0, may be at least one of a triangle, a quadrilateral, a pentagon, a hexagon, a heptagon, etc. One side of the shape of the dynamic visibility fence may coincide with a plane of the advertising surface. In embodiments, the dynamic visibility fence is a two-dimensional polygon generally perpendicular to the advertising surface and generally parallel to a plane on which the advertising surface is disposed, e.g., the ground. In embodiments, the dynamic visibility fence may be a three-dimensional shape to account for advertisement targets viewing from different relative locations, e.g., a billboard on a side of a building visible from multiple floors of adjacent buildings, advertisements in a shopping mall or stadium visible from multiple levels within the shopping mall or stadium, and the like.

The coordinates of the bounds of the determined dynamic visibility fence may be stored within a data structure, such as an array, in the memory 520 of the advertisement determination device 500. For example, when the shape of the dynamic visibility fence is a trapezoid, the coordinates of each vertex may be stored in the memory 520 in a data structure and may account for various times at which or conditions under which the shape of the dynamic visibility fence is determined. The coordinates of the bounds may be Global Positioning System (GPS) coordinates or the like or may be Cartesian, polar, or other coordinates determined with respect to the billboard BB01.

Figure 8:
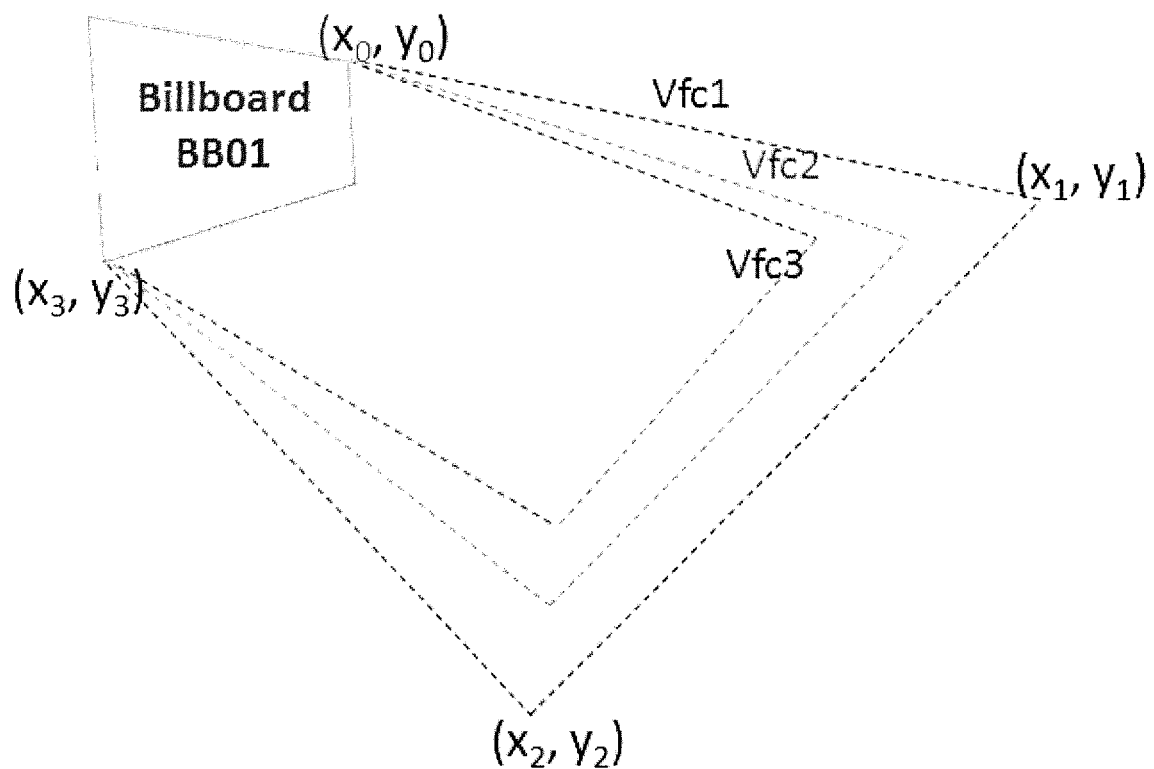
FIG. 8 shows exemplary dynamic visibility fences determined according to aspects of the present invention.

FIG. 8 shows exemplary dynamic visibility fences determined according to aspects of the present invention. FIG. 8 shows a first dynamic visibility fence Vfc1, a second dynamic visibility fence Vfc2, and a third dynamic visibility fence Vfc3 determined according to different conditions for the billboard BB01. The first dynamic visibility fence Vfc1 having determined vertices of $(x_0, y_0)$, $(x_1, y_1)$, $(x_2, y_2)$, and $(x_3, y_3)$. Each of the second dynamic visibility fence Vfc2 and third dynamic visibility fence Vfc3 has similar determined vertices at different coordinates that are not labeled.

The first dynamic visibility fence Vfc1, second dynamic visibility fence Vfc2, and third dynamic visibility fence Vfc3 are determined by operations described herein with respect to FIG. 7 according to different conditions. For example, the first dynamic visibility fence Vfc1 may have a visibility of 5 as determined at step 720, an advertisement content size of 3 as determined at step 730, and an advertisement color of 4 as determined at step 740. The second dynamic visibility fence Vfc2 and the third dynamic visibility fence Vfc3 are determined similarly to the first dynamic visibility fence Vfc1 but have respective determined advertisement colors of 3 and 2.

As shown in FIG. 8, the first dynamic visibility fence Vfc1, having the largest determined factor for an advertisement color, is larger than the second dynamic visibility fence Vfc2 and the third dynamic visibility fence Vfc3. The third dynamic visibility fence Vfc3, having the smallest determined factor for an advertisement color, is smaller than the first dynamic visibility fence Vfc1 and the second dynamic visibility fence Vfc2. The second dynamic visibility fence Vfc2, having an intermediate determined factor for an advertisement color, is smaller than the first dynamic visibility fence Vfc1 and larger than the third dynamic visibility fence Vfc3.

One side of each of the first dynamic visibility fence Vfc1, the second dynamic visibility fence Vfc2, and the third dynamic visibility fence Vfc3 coincides with a plane of the billboard BB01. In embodiments, the first dynamic visibility fence Vfc1, the second dynamic visibility fence Vfc2, and the third dynamic visibility fence Vfc3 are generally perpendicular to the billboard BB01 and generally parallel a surface on which the billboard BB01 is disposed. The first dynamic visibility fence Vfc1, the second dynamic visibility fence Vfc2, and the third dynamic visibility fence Vfc3 are shown in FIG. 8 to extend from opposing corners of the billboard BB01 but aspects are not limited thereto such that the determined dynamic visibility fences may extend between adjacent corners of the billboard BB01.

The visibility determined at step 720 and the advertisement content size determined at step 730 may affect the size of the determined dynamic visibility fence similar to the advertisement color determined at step 740 as illustrated in FIG. 8 according to aspects of the invention. Additionally or alternatively, the features of the advertising surface determined at step 710 similarly affect the size of the determined dynamic visibility fence.

As shown in FIG. 8, the various conditions determined may result in the determined shape of the dynamic visibility fence to differ. For example, the higher factor for advertisement color of the first dynamic visibility fence Vfc1 resulted in a greater length of a side of the first dynamic visibility fence Vfc1 opposite from the side coincident with the billboard BB01 than the second dynamic visibility fence Vfc2 and the third dynamic visibility fence Vfc3. The higher factor for advertisement color of the first dynamic visibility fence Vfc1 resulted in the first dynamic visibility fence Vfc1 extending a greater distance from the billboard BB01 than the second dynamic visibility fence Vfc2 and the third dynamic visibility fence Vfc3. The other determined factors may similarly affect the shape of the determined dynamic visibility fence.

Figure 9:
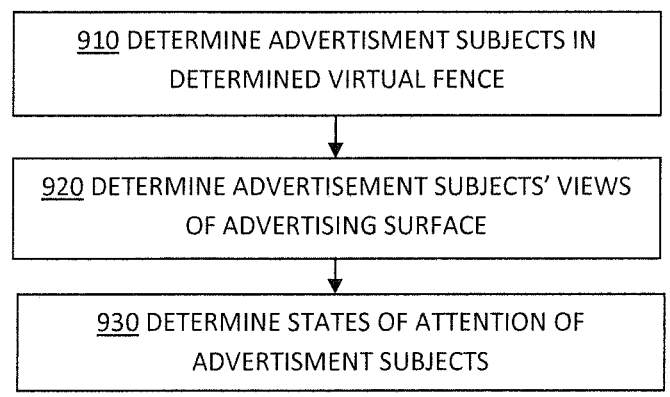
FIG. 9 shows an example flowchart for determining a target audience for the determined dynamic visibility fence according to aspects of the present invention.

FIG. 9 shows an example flowchart for determining a target audience density for the determined visibility fence according to aspects of the present invention. The method may be implemented, for example, by processor 510 of the advertisement determination device 500 of FIG. 5. Various data from the at least one sensor 550 of the advertisement determination device 500 may be analyzed using machine learning and visual analytics algorithms to determine advertisement targets' attention, the determined visibility fence, moving or stationary objects that may at least partially block the advertisement targets' view of the advertising surface, advertisement targets interests, and an average velocity of the advertisement targets with respect to the advertising surface. In embodiments, the advertisement targets' attention may be determined in real time by determining that an advertisement target is having a conversation, singing, or changing lanes while driving.

At step 910, the advertisement determination device 500 determines advertisement targets in the determined visibility fence. The advertisement determination device 500 determines attributes of advertisement targets including direction of travel, location of travel, velocity of travel, traffic patterns, etc. In embodiments, the direction, location, and velocity may be of a vehicle, for example, traveling along a highway in a middle lane at a velocity relative to the advertising surface. The attributes of the advertisement targets may be determined or received from the at least one sensor 550 of the advertisement determination device 500, which may include IoT sensors. The advertisement determination device 500 predicts and/or determines whether and/or when the advertisement target or vehicle is or will be within the determined dynamic visibility fence. Such prediction and/or determination may predict that an advertisement target or vehicle will be in the determined dynamic visibility fence at a current or future time, for example, by receiving or collecting data along a highway at a distance from an advertising surface of a billboard and/or historical traffic patterns. For example, the advertisement determination device 500 determines a set of vehicles containing advertisement targets that will be within the determined dynamic visibility fence Vfc at a time t1.

At step 920, the advertisement determination device 500 determines advertisement targets' views of the advertising surface. For the vehicles or advertisement targets determined to be within the determined dynamic visibility fence Vfc at a time t1 at step 910, or with respect to all vehicles for which data is available and reasonably relevant, the advertisement determination device 500 determines attributes of advertisement targets including direction and location of travel, dimensions of the advertisement targets, relative velocities of the advertisement targets, and potential or known obstructions to viewing of the advertising surface. In embodiments, the advertisement determination device 500 may determine attributes such as lane of travel of the vehicles travelling along a highway, dimensions of vehicles travelling along the highway, relative speed of the vehicles travelling along the highway, and objects that may obstruct views of the passengers, e.g., advertisement targets, travelling in the vehicles of the advertising surface. The objects that may obstruct views of the passengers travelling in the vehicles may include other vehicles, e.g., tractor trailers, as determined according to the relative velocities of the vehicles. Other objects that obstruct views may be stationary objects alongside the highway, e.g., trees, poles, billboards, etc. The advertisement determination device 500 determines a set of vehicles containing advertisement targets capable of viewing the advertising surface based on such determined attributes.

At step 930, the advertisement determination device 500 determines a state of the attention of the advertisement target. For the vehicles or advertisement targets determined to be within the determined dynamic visibility fence Vfc at a time t1 at step 910, or with respect to all vehicles for which data is available and reasonably relevant, the advertisement determination device 500 determines attributes of advertisement targets including advertisement targets' availability for safely viewing an advertisement on an advertising surface. Such availability may be based on whether the advertisement target is engaged in a conversation with occupants of the vehicle or by telephone, listening to or singing with music, changing lanes, etc. The advertisement determination device 500 determines a set of vehicles containing advertisement targets available to safely view the advertisement on the advertising surface.

Figure 10:
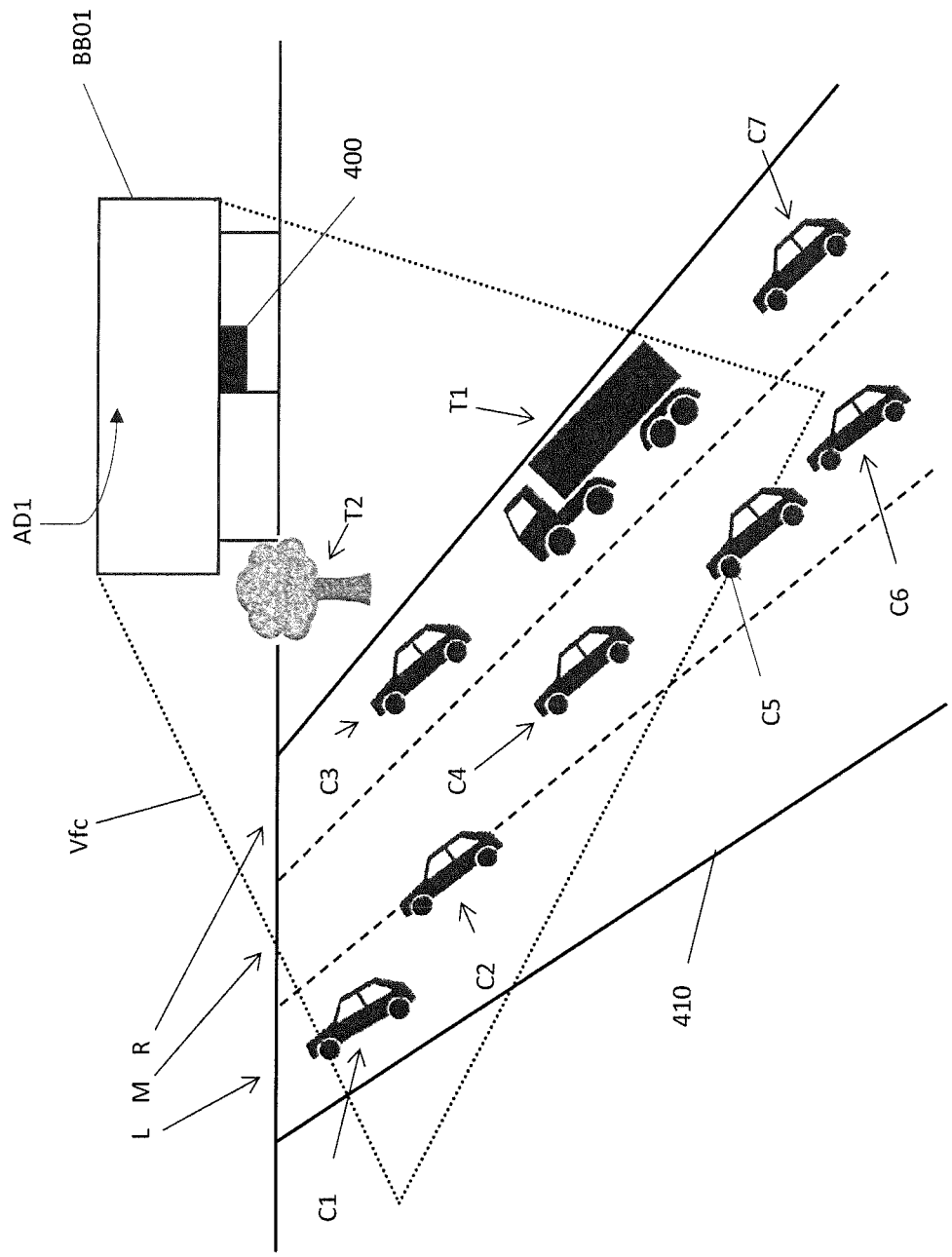
FIG. 10 shows exemplary determined target audiences determined according to aspects of the present invention.

FIG. 10 shows exemplary determined target audiences determined according to aspects of the present invention. FIG. 10 is described with respect to the steps of FIG. 9. FIG. 10 is similar to FIG. 4 as described herein, and description of similar features therebetween is omitted.

In FIG. 10, cars C1-C7 and truck T1 are shown travelling along the highway 410, which includes the left lane L, the middle lane M, and the right lane R, toward a sports stadium. The billboard BB01 displays an advertisement AD1 generally related to basketball. At times, traffic travelling toward a basketball stadium has a significant number of advertisement targets interested in basketball.

Car C1 is in the left lane L, cars C4, C5, and C6 are in the middle lane M, and cars C3 and C7 and truck T1 are in the right lane R. Car C2 is changing lanes from the left lane L to the middle lane M. The truck T1 and tree T2 may obstruct a view of the advertisement AD1 on the billboard BB01 from the highway 410.

The advertisement determination device 500 determines a set of vehicles containing advertisement targets that will be within the determined dynamic visibility fence Vfc at a time t1 according to the direction, location, and velocity of a set of vehicles traveling along a highway. For example, of the set of vehicles C1-C7 and T1 travelling along the highway, the advertisement determination device 500 may determine that cars C1, C2, C3, C4, and C5 and truck T1 are within or are predicted to be within the determined visibility fence Vfc in operation 910 of FIG. 9. Cars C6 and C7 are outside of the determined visibility fence Vfc at time t1.

The advertisement determination device 500 determines a set of vehicles containing advertisement targets capable of viewing the advertising surface based on determined attributes such as lane of travel of the vehicles travelling along the highway 410, dimensions of vehicles travelling along the highway, relative speed of the vehicles travelling along the highway, and objects that may obstruct views of the advertisement targets travelling in the vehicles of the advertising surface. For example, of the set of vehicles C1, C2, C3, C4, and C5 and truck T1 determined or predicted to be within the determined visibility fence Vfc in operation 910 of FIG. 9, the advertisement determination device 500 determines that cars C1, C2, and C4, and truck T1 have an unobstructed view of the advertising surface at step 920. As shown in FIG.

10, the view of the advertisement AD1 on the billboard BB01 of the advertisement targets of car C3 is obscured by a tree T2, and the view of the advertisement AD1 on the billboard BB01 of the advertisement targets of car C5 is obstructed by the truck T1. In embodiments, vehicles for which data is available and reasonably relevant may be additionally considered instead of the set of vehicles determined at step 910.

The advertisement determination device 500 determines a set of vehicles containing advertisement targets available to safely view the advertisement on the advertising surface. Of the set of vehicles C1, C2, C4, and T1 determined to have an unobstructed view of the advertising surface, the advertisement determination device 500 determines that advertisement targets in cars C1 and C4 and truck T1 may view the advertisement on the advertising surface safely and determines the set of vehicles C1, C4, and T1 as the target audience. For example, car C2 is changing lanes such that the advertisement target, e.g., driver, may not safely view the advertisement. In embodiments, vehicles for which data is available and reasonably relevant may be additionally considered instead of the set of vehicles determined at step 910 and/or at step 920.

Figure 11:
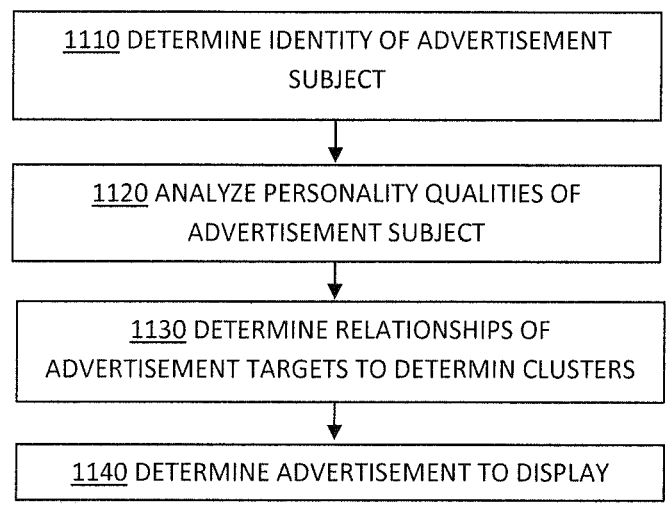
FIG. 11 shows an example flowchart for determining an advertisement to display according to aspects of the present invention.

FIG. 11 shows an example flowchart for determining an advertisement to display according to aspects of the present invention. The advertisement determination device 500 enhances the mechanisms of predicting a target audience according to their specific interests by analyzing social media about the advertisement targets' preference and affinity towards the advertisement displayed, for example, on the advertising surface of the billboard and by leveraging data from at least one sensor, e.g., IoT sensors, and user transactions.

At step 1110, the advertisement determination device 500 determines an identity of the advertisement target. For example, various data from the at least one sensor 550 of the advertisement determination device 500 may be analyzed using machine learning and visual analytics algorithms to determine an identity of the advertisement target, e.g., passengers of a vehicle. Identity of the advertisement target may be determined by looking up a license plate of a vehicle or by receiving and/or requesting identity information from a mobile device of the advertisement target.

At step 1120, the advertisement determination device 500 analyzes personality qualities of the advertisement target. A complete search and analysis of any available data may be performed by, for example, processor 510 of the advertisement determination device 500. For example, social media profiles, demographics, psychographic profiles, customer relations management (CRM) insights, interests, click streams, IoT sensor data, etc, may be searched and analyzed to determine a complete profile, at least as complete as data and analysis time will allow.

At step 1130, the advertisement determination device 500 determines relationships of the determined advertisement targets to determine clusters of advertisement targets. The processor 510 of the advertisement determination device 500 may analyze the determined personality profiles of the advertisement targets, for example, by executing an algorithm to perform clustering analysis. A k-means clustering analysis may be performed to determine a map of clusters of advertisement targets having a similar interest. For example, from among the advertisement targets determined to be in the determined dynamic visible fence, having a safe and unobstructed view, the advertisement determination device 500 may determine that passengers of cars C1 and C2 follow a first basketball team on social media, which indicates an interest in the first basketball team. In embodiments, cars C1 and C2 and/or advertisement targets, e.g., passengers, in cars C1 and C2 may be understood as a cluster having a similar interest.

At step 1140, the advertisement determination device 500 determines an advertisement to display. The advertisement determination device 500 can customize and determine an advertisement to display based on the clusters as determined at step 1130 accounting for analysis of the weighted matching on density, impact variables, analytically derived personality traits, content traits, etc., as determined according to aspects of the present invention.

Figure 12:
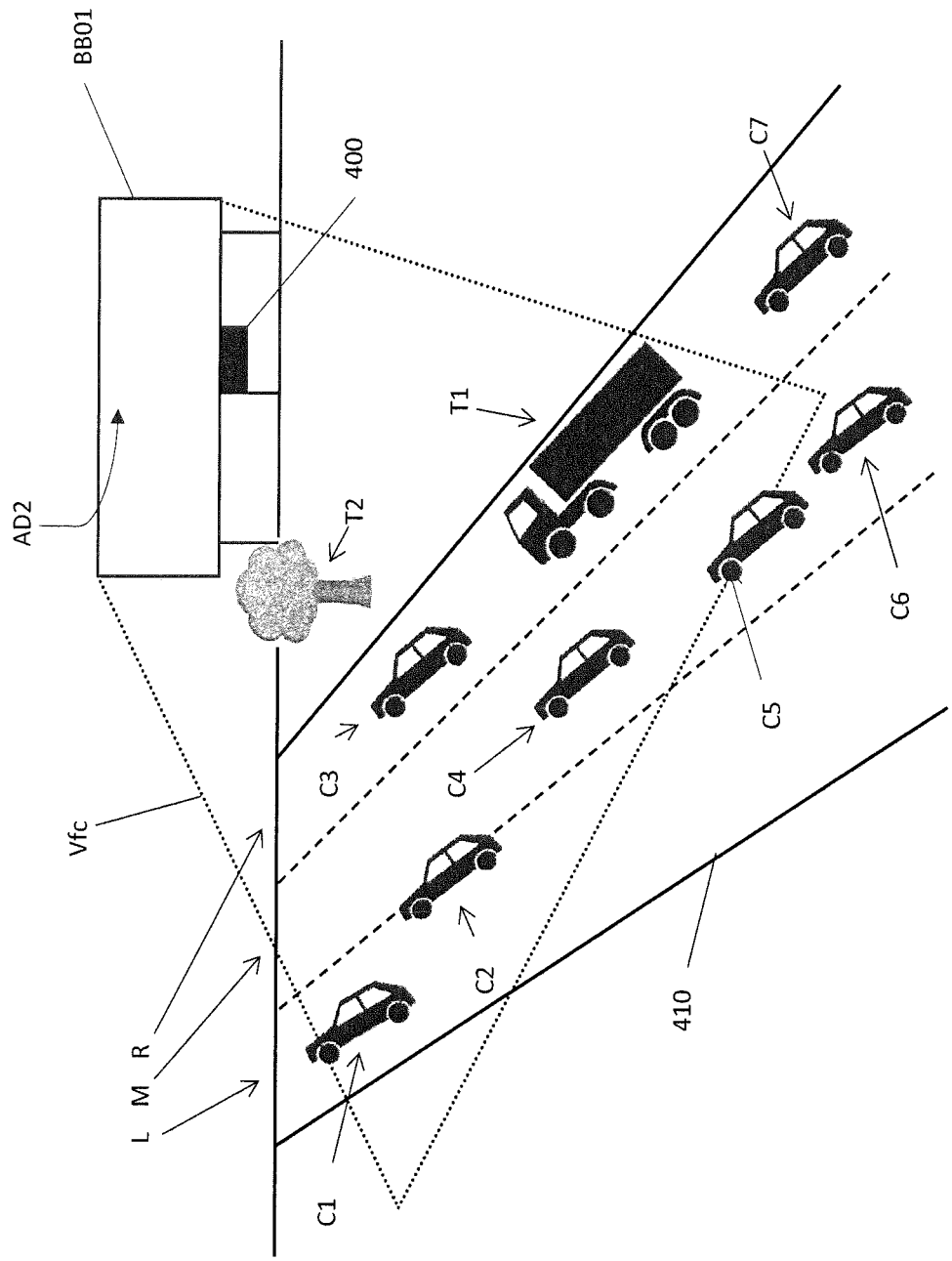
FIG. 12 shows a determined advertisement displayed according to aspects of the present invention.

FIG. 12 shows a determined advertisement displayed according to aspects of the present invention. FIG. 12 is described with respect to the steps of FIG. 11. FIG. 12 is similar to FIG. 4 and FIG. 10 as described herein, and description of similar features therebetween is omitted. In embodiments, for the vehicles or advertisement targets determined to be the target audience at step 620, or with respect to all vehicles for which data is available and reasonably relevant, the advertisement determination device 500 determines an advertisement to display on an advertising surface.

In embodiments, the advertisement determination device 500 determines identities of the advertisement targets of vehicles C1, C4, and T1 according to various data from the at least one sensor 550 of the advertisement determination device 500 at step 1110. The advertisement determination device 500 analyzes the personality qualities of the determined advertisement targets at step 1120 and performs cluster analysis at step 1130. For example, the advertisement determination device 500 may determine that the advertisement targets of both cars C1 and C4 follow the first basketball team on social media while the advertisement target of truck T1 may follow a second basketball team. Based on such cluster analysis information, the advertisement determination device 500 determines to display an advertisement AD2 featuring the first basketball team on the billboard BB01 so as to provide a better targeted advertisement to maximize the viewership.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by an advertisement determination device, conditions affecting visibility of an advertising surface;
   dynamically determining based on the conditions affecting visibility of the advertising surface, by the advertisement determination device, a dynamic visibility fence having a determined size;
   storing, by the advertisement determination device, coordinates of bounds of the dynamic visibility fence;
   receiving, by the advertisement determination device, advertisement target data;
   predicting, by the advertisement determination device, based on the advertisement target data that particular advertisement targets will be within the dynamic visibility fence at a time;
   determining, by the advertisement determination device, attributes of the particular advertisement targets including determining objects that may obstruct the view of the particular advertisement targets with respect to the advertising surface;
   determining, by the advertisement determination device, that a first set of the particular advertisement targets are positioned to view the advertisement surface based on the attributes;
   determining, by the advertisement determination device, that the attributes indicate that a subset of the first set of the particular advertisement targets can safely view the advertisement surface;
   determining, by the advertisement determination device, an advertisement to display based on a cluster analysis of the subset of the first set of the particular advertisement targets;
   displaying, by the advertisement determination device, the determined advertisement on the advertising surface; and
   determining, by the advertisement determination device, a new dynamic visibility fence having a size different than the determined size based on advertising parameters of a second advertisement.

2. The method of claim 1, wherein the determining the dynamic visibility fence comprises:
   determining features of an advertisement surface on which the determined advertisement is displayed; and
   determining the size of the dynamic visibility fence based on the determined features of the advertisement surface.

3. The method of claim 2, wherein the determined features of the advertisement surface comprise a width of the advertisement surface, a height of the advertisement surface, and a height above the ground of the advertisement surface.

4. The method of claim 1, wherein the determining the dynamic visibility fence comprises:
   determining visibility of the advertisement surface on which the determined advertisement is displayed based on the conditions; and
   determining the size of the dynamic visibility fence based on the determined features of the advertisement surface.

5. The method of claim 4, wherein the determining the conditions comprises determining a state of the weather at a location about the advertisement surface.

6. The method of claim 1, wherein the determining the dynamic visibility fence comprises:
   determining content size and color of the determined advertisement; and
   determining the size of the dynamic visibility fence based on the determined content size and color of the determined advertisement.

7. The method of claim 1, further comprising determining a target audience density for the determined dynamic visibility fence, wherein the determining the advertisement is further based on the determined target audience density.

8. The method of claim 7, wherein the determining the target audience density comprises:
   determining advertisement targets' lines of sight to the advertising surface; and
   determining states of attention of the advertisement targets.

9. The method of claim 8, wherein the determining the lines of sight comprises determining relative velocities of vehicles travelling along a roadway.

10. The method of claim 8, wherein the determining the lines of sight comprises determining whether a line of sight is obstructed by one or more static objects.

11. The method of claim 8, wherein the determining the states of attention comprises determining that a vehicle travelling along a roadway is changing lanes.

12. The method of claim 1, wherein the determining the advertisement comprises:
   determining an identity of at least one advertisement target;
   analyzing personality qualities of the advertisement targets; and
   determining relationships of the advertisements targets to determine a second set of advertisement targets, the determining the relationships being based on the cluster analysis.

13. A computer program product for an advertisement determination system, the computer program product comprising a computer readable storage medium having program instructions embodied therewith, the program instructions executable by an advertisement determination device to cause the advertisement determination device to:
   receive data from at least one sensor of the advertisement determination device;
   determine conditions affecting visibility of an advertising surface;
   dynamically determine a dynamic visibility fence having a determined size based on the conditions;
   store coordinates of bounds of the dynamic visibility fence;
   receive advertisement target data;
   predict, based on data collected at a distance from the advertising surface, that particular advertisement targets will be within the dynamic visibility fence at a time;

determine attributes of the advertisement targets including determining objects that may obstruct the view of the advertisement targets with respect to the advertising surface;

determine that the advertisement target data indicates that a first set of advertisement targets are positioned to view the advertisement surface;

determine that the advertisement target data indicates that a subset of the first set of advertisement targets can safely view the advertisement surface;

determine an advertisement to display based on the received data of the subset of the first set of advertisement targets; and display the determined advertisement.

14. The computer program product of claim 13, wherein the advertisement determination device determines an identity of at least one advertisement target based on the received data.

15. The computer program product of claim 14, wherein the received data is selected from a group consisting of still image data, video image data, and license plate data.

16. A system comprising:

a CPU, a computer readable memory and a computer readable storage medium associated with an advertisement determination device;

program instructions to determine conditions affecting visibility of an advertising surface;

program instructions to store coordinates of bounds of the dynamic visibility fence;

program instructions to determine a first dynamic visibility fence defining a first area having a determined sized at least partially about the advertising surface based on the conditions;

program instructions to determine that a first advertisement target is located within the determined first dynamic visibility fence;

program instructions to determine attributes of the first advertisement target;

program instructions to determine whether a line of sight of the first advertisement target with respect to the advertising surface is obstructed by one or more static objects;

program instructions to determine that the attributes indicate that the first advertisement target can safely view the advertisement surface;

program instructions to display a first advertisement on the advertising surface based at least in part on the determined line of sight of the first advertisement target, wherein the program instructions are stored on the computer readable storage medium for execution by the CPU via the computer readable memory.

17. The system of claim 16, further comprising program instructions to determine a second visibility fence defining a second area at least partially about the advertising surface, the second area being different from the first area.

18. The system of claim 17, wherein the program instructions determine a line of sight to a second advertisement target located within the determined second dynamic visibility fence, the second advertisement target being different from the determined advertisement target.

19. The system of claim 18, wherein the program instructions display a second advertisement on the advertising surface based at least in part on the determined line of sight of the second advertisement target.

20. The method of claim 1, wherein the dynamically determining the dynamic visibility fence is based on the following conditions: weather conditions; a time of day; a size of advertising content; and advertisement content color.

* * * * *